United States Patent [19]

Govoni et al.

[11] 4,252,968
[45] Feb. 24, 1981

[54] PROCESS FOR PREPARING GRANULAR POLYCARBONATE

[75] Inventors: Gabriele Govoni, Renazzo; Roberto Flammini, Ferrara; Remo Vaccari, Poggio Renatico; Pier L. Guardigli, Ferrara, all of Italy

[73] Assignee: Montedison S.p.A., Milan, Italy

[21] Appl. No.: 43,465

[22] Filed: May 29, 1979

[30] Foreign Application Priority Data

May 29, 1978 [IT] Italy .............................. 23924 A/78

[51] Int. Cl.$^3$ ........................... C08J 3/12; C08J 11/02
[52] U.S. Cl. ................................. 528/483; 528/196; 528/500; 528/502

[58] Field of Search ............... 528/196, 502, 500, 483; 427/185

[56] References Cited

U.S. PATENT DOCUMENTS 4,120,849  10/1978  Brietschaft et al. ................. 528/502

Primary Examiner—Theodore E. Pertilla

[57] ABSTRACT

A continuous process for simultaneously drying, thickening and increasing the flowability and processibility of polycarbonate powders is disclosed. The powders are fed to a tubular drier equipped with a mechanical stirrer in which they are fluidized with the aid of a stream of heated inert gas or vapor flowing countercurrently to the powders.

5 Claims, 4 Drawing Figures

PROCESS FOR PREPARING GRANULAR POLYCARBONATE

THE PRIOR ART

It is known to flash the solvent off solutions of polycarbonates produced by known synthesis processes, in particular by interfacial phosgenation and polycondensation.

The flash-drying of the solutions presents problems with the removal of the residual amounts of solvent and moisture, if any, in connection with storage of the powders obtained, and with the capacity of the extruders in which the powders are eventually processed. Moreover, those powders have, generally, a low apparent density and a low flowability.

THE PRESENT INVENTION

An object of this invention is to provide an improved process for obtaining the polycarbonates in the form of free-flowing granules and which does not have the disadvantages of the process involving flash-drying of solutions of the polycarbonates in solvents therefor.

This and other objects are achieved by the present invention in accordance with which polycarbonate powders are simultaneously dried and thickened with increase in the flowability and processability of the granular polycarbonates obtained by continuously feeding the starting polycarbonate powder to a tubular drier equipped with a mechanical stirrer, where said powders are fluidized by a countercurrent stream of a heated inert gas or vapor. The stirrer consists of a set of little bars orthogonally and spirally inserted along a shaft, coaxial with said drier, rotating at a peripheral speed of 0.5-2 m/sec. The polycarbonate powder is maintained under stirring for at least two minutes at temperatures ranging from 165° to 190° C.

According to the process of this invention, it is possible to thicken powders having an apparent density lower than 0.5 kg/dm$^3$ and a moisture content up to 30% by weight.

In particular it is possible to utilize powders prepared, according to U.S. patent application Ser. No. 14,161, U.S. Pat. No. 4,212,967, issued July 15, 1980, from solutions in methylene chloride of polycarbonate prepared by interfacial phosgenation and polycondensation of bisphenol-A.

Nitrogen or water vapor is preferably used as inert medium for fluidizing the powders, keeping such feeding rates as to have fluidized bed conditions in the apparatus. The fluidized bed temperature or the thickening temperature is selected in the range of from 165° to 190° C. as a function of the inherent viscosity of the polycarbonate and of the apparent density of the fed powder. Said temperature is adjusted by acting on the temperature of the fed gas or vapor and on the temperature of the drier wall.

A better regulation is generally obtained when the drier jacket is maintained at temperatures higher than that of the fluidizing gas or vapor.

It is also possible to operate by utilizing a multi-stage fluid bed at rising temperatures, such stages consisting, for example, of independent jackets, so that the fed powder is subjected to gradually increasing temperatures during its passage through the drier.

Generally the free end of each stirrer bar is at a distance not greater than 5 mm from the drier wall.

In practice, it is advisable to coat the section from which the thickened polymer is discharged with an insulating material, for example polytetrafluoroethylene, in order to prevent the polymer from softening and caking when coming into contact with the hot wall; optionally it is also possible to cool the polymer by sending in countercurrent a slight nitrogen flow at room temperature.

The process of the present invention permits therefore to obtain continuously and in one step only:
- an increase of the apparent density of the polycarbonate powders,
- an increase of their flowability,
- a narrower granulometric distribution of the particles,
- the drying of the product, and
- the removal of residual amounts, if any, of organic solvent.

Also starting from powders having an apparent density lower than 0.2 kg/dm$^3$ it is possible to obtain granular powders having an apparent density up to 0.7 kg/dm$^3$ with a simultaneous narrowing of the granulometric distribution in respect of the original powder, having a flowability of about 13 seconds, free from organic solvent and having a residual moisture content lower than 100 ppm.

Such granular powders are easily processable and can be directly used in the processing apparatuses without causing caking and pulsation phenomena, obtaining, by consequence, regular operating conditions of the apparatuses with a consequent increase of their hourly capacity.

By operating according to this process it is possible to avoid the process granulation step, what results in a further simplification of the plant finishing line and, consequently, in lower investment and operating costs, while avoiding degradation phenomena and modifications of the typical qualities of the polycarbonate, such as optical, transparency and color properties, thermal stability and molecular weight, especially in the case of polycarbonates at a high molecular weight.

The apparatus utilized for practicing the process of the present invention is simple and of very reduced dimensions, involves low investment and operating costs and permits to attain a very high productivity, of the order of 1,500 kg/m$^3$/h.

Referring to the accompanying drawings.

Figure 1:
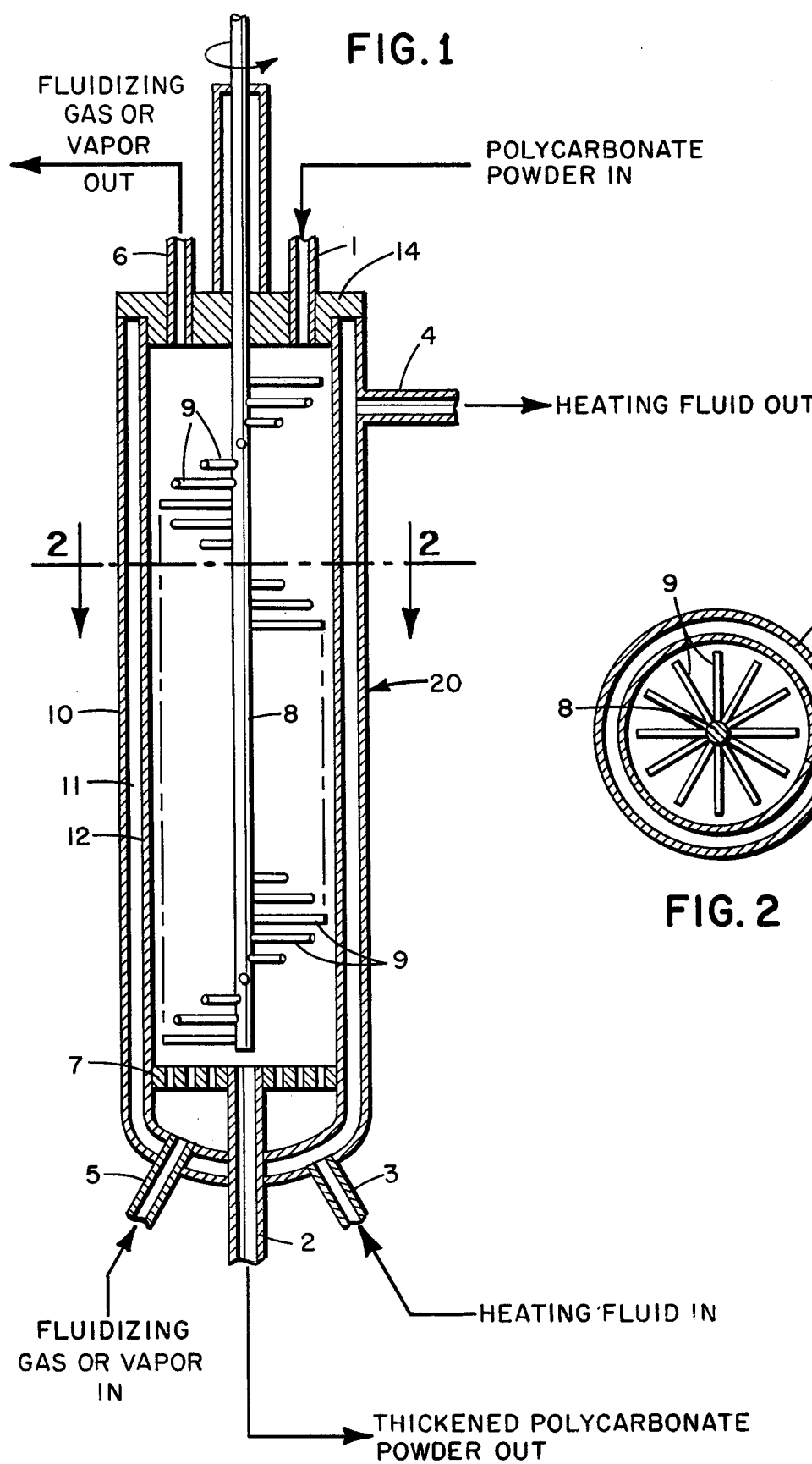
FIG. 1 shows an example of apparatus for practicing the process of the present invention, consisting of a tubular drier equipped with an interiorly disposed stirrer.

In FIG. 1, the powders to be thickened enter the drier through inlet 1. The drier 20 comprises a cylindrical outer wall 10, a concentric inner wall 12 and an enclosed space 11 between said outer and inner walls. The bottom wall is integral with the side walls. The upper end of the drier is closed by a cap 14. A stirring rod 8 rotatably passes through cap 14 and extends coaxially down into the drier for most of its height. Small radially spaced rods 9 attached perpendicularly to rod 8 are arranged spirally along the length of rod 8, as shown in FIG. 1. The stirring rod 8 is rotated at a constant speed by a motor (not shown).

A perforated plate 7, located near the bottom of the drier, acts to distribute the fluidizing gas or vapor evenly through the powder in the drier. Said fluidizing gas or vapor enters through conduit 5 in the bottom wall of the drier under plate 7, passes upwardly through the powder and leaves through conduit 6 in cap 14.

A heating fluid may be introduced, through conduit 3, into space 11 surrounding the drier, and leave through conduit 4.

The thickened powder is discharged through pipe 2 attached to the center of plate 7 and passing through the bottom wall of the drier.

The temperature of the powder in the drier can be controlled by maintaining the drier wall at temperatures higher than 170° C., and the gas or vapor at lower temperatures.

The apparent density of the polycarbonate powders, expressed in g/cc, has been determined by measuring the volume of the powders after ramming according to standard DIN No. 53194.

The polycarbonate powder flowability, expressed in seconds per 100 grams of powder, which indicates the time required by a standard amount of material to flow through an orifice of certain dimensions, is measured according to standard ASTM D No. 1895/69, method A.

The following examples are given to illustrate the invention in more detail, and are not intended to be limiting.

EXAMPLE 1

A polycarbonate powder obtained, according to U.S. patent application Ser. No. 14,161, from solution of polycarbonate in methylene chloride, having an inherent viscosity of 0.52, prepared by interfacial phosgenation and polycondensation of bisphenol-A, was continuously fed, in the direction of arrow 1, to an apparatus operating continuously, schematically shown in FIG. 1, having an inside diameter of 90 mm and a height of 600 mm. The fed powders had the following characteristics:

apparent density     0.19 g/cc
flowability     none.

The powder was maintained under stirring and in a hot nitrogen flow, which entered from the bottom of the apparatus arrow 5 in countercurrent to the product discharged according to arrow 2. The operative conditions in the apparatus were as follows:

|  | °C. |
|---|---|
| drier jacket temperature | 175 |
| nitrogen temperature, at the inlet | 170 |
| temperature of the fed powder | 20 |
| powder thickening temperature | 170 |
| number of rotations of the stirrer | 200 r.p.m. |
| nitrogen velocity inside the apparatus | 0.17 m/sec. |
| residence time | 30 minutes |

The discharged thickened powder had the following characteristics:

| apparent density | 0.56 g/cc |
|---|---|
| flowability | 20 seconds. |

EXAMPLE 2

In the same apparatus and according to the same procedure described in Example 1, a test was carried out to thicken polycarbonate powders prepared as indicated in Example 1, but having the following characteristics:

| apparent density | 0.16 g/cc |
|---|---|
| flowability | none. |

Furthermore, the following operative conditions were kept:

|  | °C. |
|---|---|
| jacket temperature | 168 |
| nitrogen temperature at the inlet | 180 |
| temperature of the fed powder | 20 |
| powder thickening temperature | 173 |
| number of rotations of the stirrer | 200 r.p.m. |
| nitrogen velocity inside the apparatus | 0.17 m/sec. |
| residence time | 27 minutes. |

The discharged thickened powders had the following characteristics:

| apparent density | 0.58 g/cc |
|---|---|
| flowability | 16 seconds. |

Figure 2:
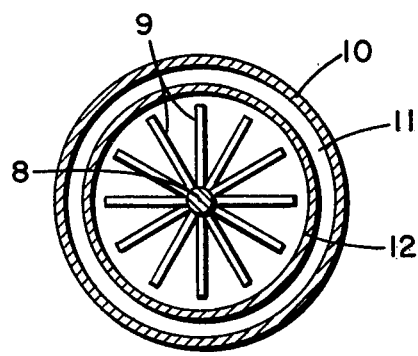
FIG. 2 is a cross-sectional view taken on line 2—2 of FIG. 1.

For the granulometric distributions of the initial powder and of the powder after thickening, see FIG. 2 of the drawings.

EXAMPLE 3

Example 2 was repeated with the exception that the fed polycarbonate powders had the following characteristics:

| apparent density | 0.16 g/cc |
|---|---|
| flowability | none. |

The following operative conditions were maintained:

|  | °C. |
|---|---|
| jacket temperature | 185 |
| nitrogen temperature at the inlet | 160 |
| temperature of the fed powder | 20 |
| powder thickening temperature | 174 |
| number of rotations of the stirrer | 200 r.p.m. |
| nitrogen velocity inside the apparatus | 0.17 m/sec. |
| residence time | 12 minutes. |

The discharged thickened powder had the following characteristics:

| apparent density | 0.58 g/cc |
|---|---|
| flowability | 16 seconds. |

EXAMPLE 4

Example 2 was repeated with the exception that the fed polycarbonate powders had the following characteristics:

| | |
|---|---|
| apparent density | 0.40 g/cc. |
| flowability | 26 seconds. |

Furthermore, the following operative conditions were maintained:

| | °C. |
|---|---|
| jacket temperature | 192 |
| nitrogen temperature at the inlet | 92 |
| temperature of the fed powder | 20 |
| powder thickening temperature | 165 |
| number of rotations of the stirrer | 200 r.p.m. |
| nitrogen velocity inside the apparatus | 0.17 m/sec. |
| residence time | 25 minutes. |

Thickened powders having the following characteristics were obtained:

| | |
|---|---|
| apparent density | 0.70 g/cc |
| flowability | 13 seconds. |

EXAMPLE 5

Example 2 was repeated with the exception that the fed polycarbonate powders had the following characteristics:

| | |
|---|---|
| apparent density | 0.30 g/cc |
| flowability | 38 seconds. |

The following operative conditions were maintained:

| | °C. |
|---|---|
| jacket temperature | 173 |
| nitrogen temperature at the inlet | 145 |
| temperature of the fed powder | 20 |
| powder thickening temperature | 168 |
| number of rotations of the stirrer | 200 r.p.m. |
| nitrogen velocity inside the apparatus | 0.17 m/sec. |
| residence time | 20 minutes. |

The discharged thickened powder exhibited the following characteristics:

| | |
|---|---|
| apparent density | 0.56 g/cc |
| flowability | 15 seconds. |

Figure 3:
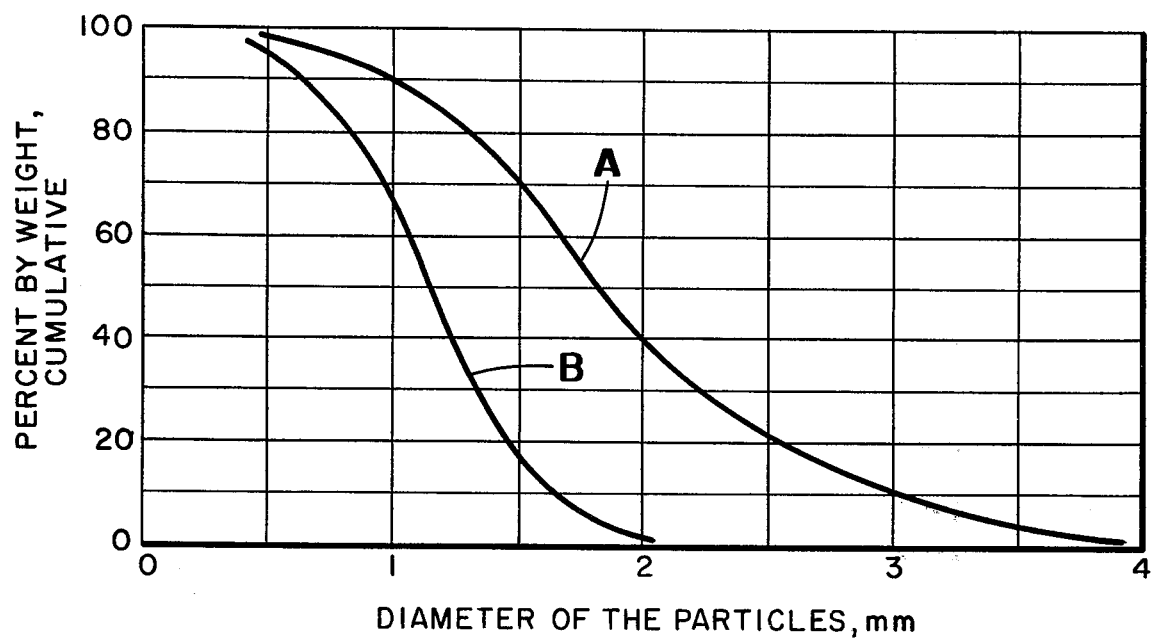
FIG. 3 shows the granulometric distributions of the initial polycarbonate powder (Curve A), and of the powder after thickening (Curve B) as found for the powder of Example 2, infra.
Figure 4:
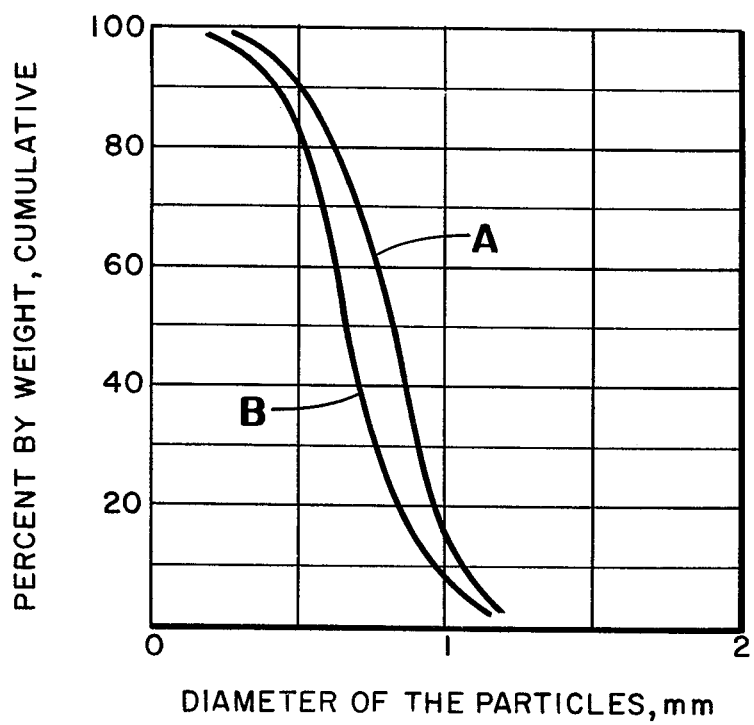
FIG. 4 shows the granulometric distributions of the initial polycarbonate powder (Curve A) and of the powder after thickening (Curve B) as found for the powder of Example 5, infra.

For the granulometric distributions of the initial powder and of the powder after thickening see FIG. 3 of the drawings.

EXAMPLE 6

Example 1 was repeated with the following variations: to fluidize the powders, superheated water vapor was used instead of nitrogen, the fed polycarbonate powders had the following characteristics:

| | |
|---|---|
| apparent density | 0.35 g/cc |
| flowability | 29 seconds. |

The following operative conditions were maintained:

| | °C. |
|---|---|
| jacket temperature | 182 |
| water vapor temperature at the inlet | 165 |
| temperature of the fed powder | 20 |
| thickening temperature of the powder | 169 |
| number of rotations of the stirrer | 200 r.p.m. |
| vapor velocity inside the apparatus | 0.17 m/sec. |
| residence time | 20 minutes. |

The discharged thickened powder had the following characteristics:

| | |
|---|---|
| apparent density | 0.58 g/cc |
| flowability | 14 seconds. |

What we claim is:

1. A continuous process for preparing granular polycarbonate, comprising continuously feeding polycarbonate powders to a tubular drier equipped with a rotating mechanical stirrer, and fluidizing the powder in the drier by means of a countercurrent stream of inert heated gas or vapor while maintaining the powder under stirring and at temperatures ranging fom 165° to 190° C. for a residence time of at least two minutes.

2. The process of claim 1, in which the inert fluidizing medium is nitrogen or water vapor.

3. The process of claim 1, in which the temperature of the powder in the drier is controlled by maintaining the drier wall at temperatures higher than 170° C., and the gas or vapor at lower temperatures.

4. A continuous process for preparing granular polycarbonate, comprising continuously feeding polycarbonate powders to a tubular drier equipped with a mechanical stirrer, wherein the powders are fluidized by a heated inert gas or vapor sent in countercurrent, in which the stirrer consists of a set of little bars orthogonally and spirally inserted along a shaft, coaxial with said drier, rotating at a peripheral speed of 0.5–2 m/sec., and in which the polycarbonate powder is maintained under stirring at temperatures ranging from 165° to 190° C. for residence times of at least two minutes.

5. The process of claim 4, in which the free ends of the stirrer bars are at a distance not greater than 5 mm from the drier wall.

* * * * *